United States Patent [19]

D'Agostino et al.

[11] Patent Number: 4,634,293
[45] Date of Patent: Jan. 6, 1987

[54] BATTLEFIELD ENVIRONMENT THERMAL ANALYZER

[75] Inventors: John A. D'Agostino, Alexandria; Thomas J. Lillie, Stafford, both of Va.

[73] Assignee: The United States of America as represented by the Secretary of the Army, Washington, D.C.

[21] Appl. No.: 261,839

[22] Filed: May 8, 1981

[51] Int. Cl.⁴ .................. G01K 13/00; G01K 1/02; G01K 7/04; G01J 5/00
[52] U.S. Cl. .................. 374/124; 250/316.1; 250/349; 374/102; 374/167; 73/866.4
[58] Field of Search ............ 73/340, 341, 339 C, 73/15 R, 190 EW, 342, 432 J, 432 SD; 250/316.1, 349; 374/101, 102, 103, 109, 110, 124, 137, 166, 167

[56] References Cited

U.S. PATENT DOCUMENTS

| | | | |
|---|---|---|---|
| 2,685,795 | 8/1954 | Hardy et al. | 73/341 X |
| 3,531,991 | 10/1970 | Strong et al. | 73/340 X |
| 3,596,519 | 8/1971 | Blonder | 73/15 R X |
| 3,685,343 | 8/1972 | Cochran, II | 73/15 R |
| 3,690,175 | 9/1972 | Butts | 73/432 J |
| 3,964,313 | 6/1976 | Connick | 73/432 J |
| 3,981,175 | 9/1976 | Hammond, III et al. | 73/15 R |

FOREIGN PATENT DOCUMENTS 2455966  8/1976  Fed. Rep. of Germany .... 73/339 C

Primary Examiner—Michael J. Tokar
Assistant Examiner—Tom Noland
Attorney, Agent, or Firm—Max L. Harwell; John E. Holford; Anthony T. Lane

[57] ABSTRACT

A method and apparatus for simulating thermal images of various target devices and backgrounds as they would appear when viewed with a thermal viewer. A number of test elements of varying thicknesses are arranged in such a manner that upon solar heating the thermal signature thereof will represent the particular target for which the elements have been arranged, thereby eliminating the need for having to physically pursue the acquisition of the actual target for test purposes.

2 Claims, 4 Drawing Figures

BATTLEFIELD ENVIRONMENT THERMAL ANALYZER

The invention described herein may be manufactured, used, and licensed by the U.S. Government for governmental purposes without the payment of any royalties thereon.

BACKGROUND OF THE INVENTION

1. Field of the Invention

The invention is concerned with thermal viewers.

High resolution thermal viewers are now state of the art. They generally operate in the wavelength region of one micron to fourteen microns. The images they produce are directly proportional in intensity to the temperatures of the objects or scenes under surveillance. The images, while quite different from visible images due to reflected light from the objects, are usually readily identified by the human observer. These images are thus described as signatures of the objects. In todays sophistocated computer systems these signatures are memorized and catalogued so that even subtle differences that escape human observation are available for identification of a specific target. In many ways the thermal image is a much more characterstic signature of the object than its visible image. This is because the image is emitted rather than reflected. It depends on the materials of which the object or target is made and the amount of material present. It often depends on the state of operation, as when the object contains a power source such as an internal combustion engine. Most important, however, is the inevitable effect of changes in the ambient temperature around the object. The chief causes of these changes are diurnal cycles of sunlight and air current or winds. There is usually a considerable disparity between the charges that occur in the object and those that occur in the background. At one time of day the object may almost blend into the background while at other times it will stand out in bold contrast.

2. Description of the Prior Art

It has, therefore, been the practice to study an object of interest by recording its images at various times of the day, in various types of backgrounds, at various times of the year and under various types of weather conditions. For many objects, e.g. tanks and large planes, this becomes very expensive and even tactically impossible. It also is virtually impossible where hostile objects are involved, even though a great deal of basic structural information on the object may be available.

SUMMARY OF THE INVENTION

The present invention overcomes the above difficulty in determining certain target signatures by providing a simulation apparatus and method for synthesizing the signatures of targets using only data about the target rather than the target itself.

The invention is best understood with references to the accompanying drawings wherein.

DESCRIPTION OF THE PREFERRED EMBODIMENT

Figure 1:
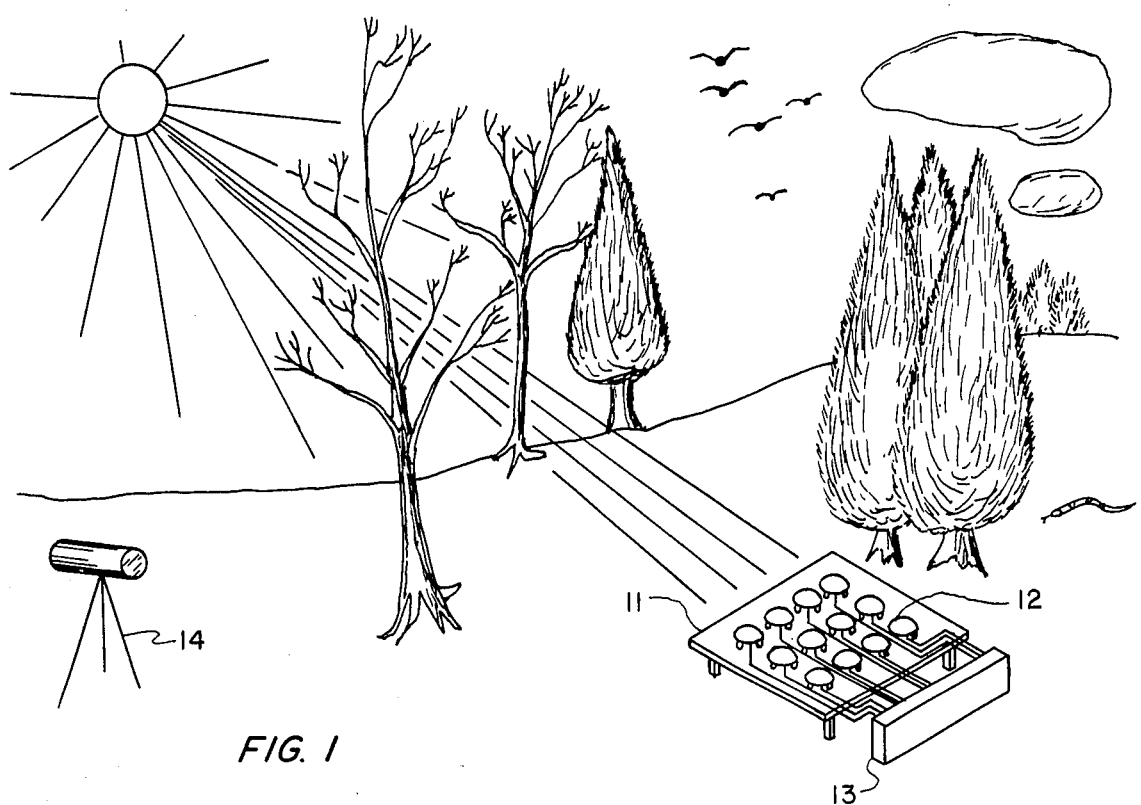
FIG. 1 shows the apparatus 11 of the present invention deployed in a typical environment.
Figure 2:
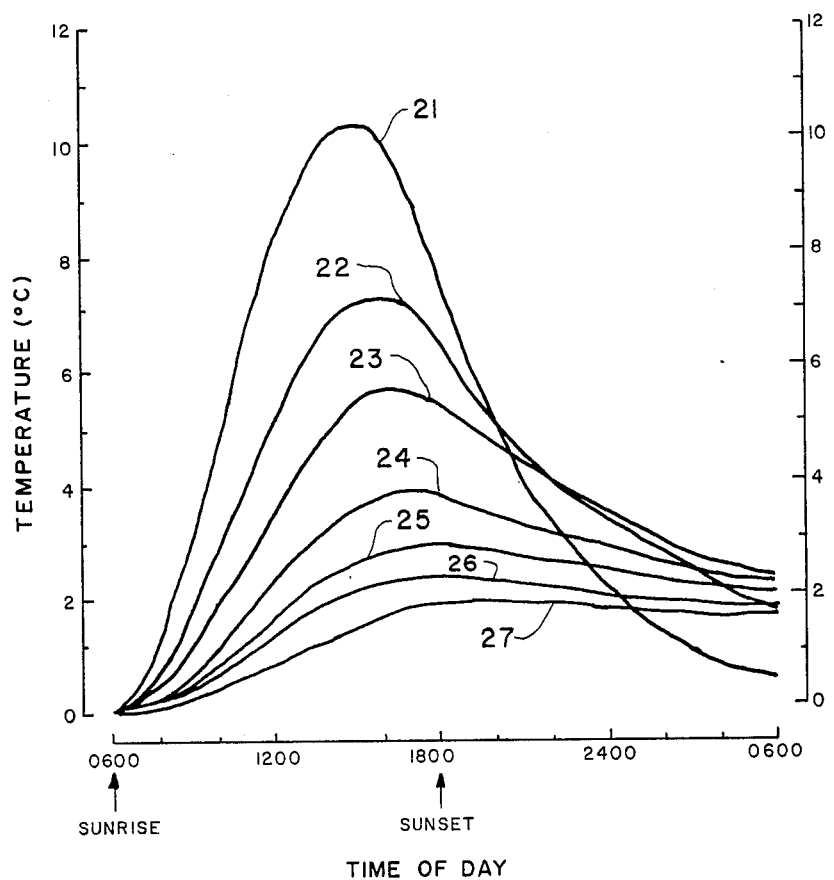
FIG. 2 shows a typical plot of the temperatures of various test elements 12 mounted on the simulation apparatus as a function of time.

Referring more particularly to FIG. 1 there is shown a typical outdoor environment against which a target may be viewed. The sun is a major element of the environment producing the greatest change in temperature. The type of earth and the trees can have a modifying effect on these temperatures. The clouds also can directly filter the sun's rays or provide precipitation to modify ground temperatures. The unseen air currents are also a very significant factor. The target object itself is represented in the present invention by the apparatus 11. This apparatus includes a plurality of test elements 12 preferably having substantially the same surface area exposed to the sun and other factors of the environment. The temperatures of the test elements are sensed and stored either by a directly connected recorder 13 or a recording radiometer 14 which scans the test elements from a distant so as not to be itself an environmental factor. A typical diurnal temperature variation of a number of different test elements is shown in FIG. 2. FIG. 2 shows the characteristic curve of the various elements 12 of FIG. 1 and elements 44, 48 and 52 of FIG. 4, where the walls of the test elements vary in thickness and thus mass from element to element and according to the basic laws of physics are capable of storing more heat with an increase in thickness and mass of the various elements. The curves of FIG. 2 merely provide means to more clearly define the thermal characteristics of the temperature retention capability of typical thickness of element material over a diurnal cycle (24 hour cycle) as represented by a thin walled material in curve 27 with a gradual increase in thickness and mass to a solid material element depicted by curve 21.

Figure 3:
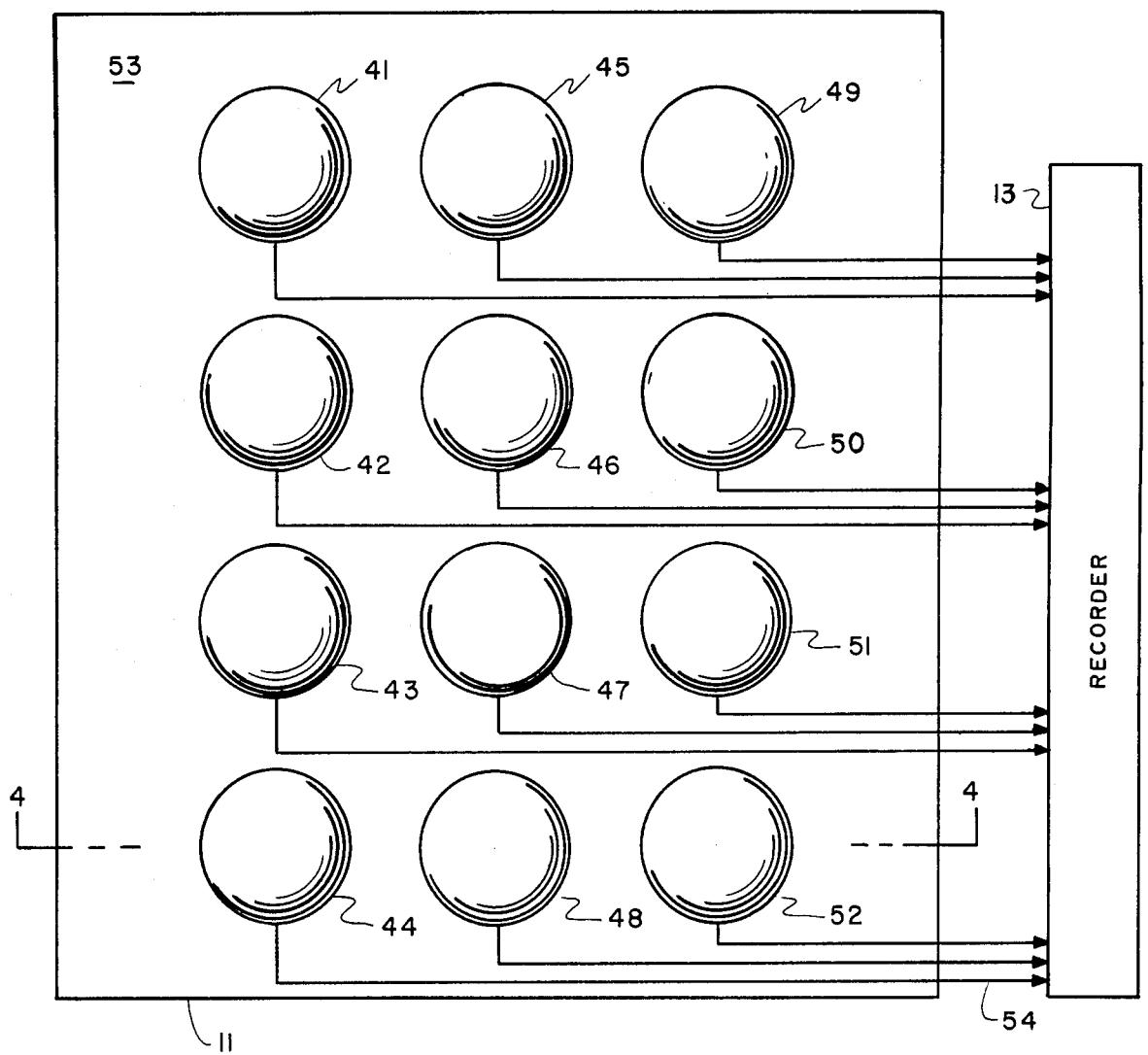
FIG. 3 is a top view of the apparatus 11 of FIG. 1.

As shown in FIG. 3, each test element 41-49 represents a general area of a target being studied which can be smaller, but will usually be larger than the test element. The overall shape of test element is not critical but interpretation of the test results is simplified, if a uniform shape is adopted. A spherical shape provides maximum simplification, but a hemispherical shape has been found to be almost as good and far more practical. This shape is easily made, mounted and instrumented and presents a nearly constant absorbing surface to solar radiation. As indicated previously an electrical conductor may interconnect each test element to a common recorder 13.

Figure 4:
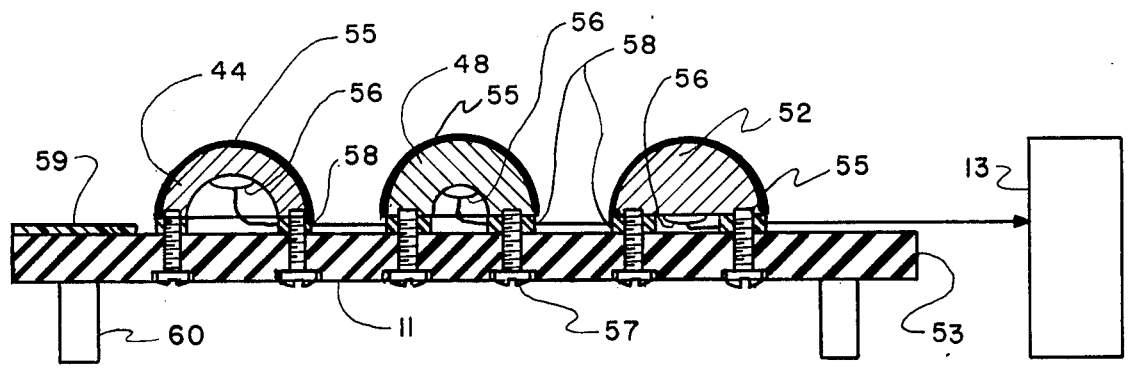
FIG. 4 is an edge view of the apparatus of FIG. 3 cutaway on section line 4—4 of FIG. 3 to show inner detail of several test elements.

FIG. 3 shows additional details of the simulation apparatus. In the preferred embodiment the test elements are all made of steel, the most common material found in military targets. The test elements are hollowed out (except for element 52) so that each has a different wall thickness as indicated in FIG. 4. The thickness is greater for higher numbered elements. The preferred embodiment also has coated test elements, the coating 55 consisting of a common variety of automative paint ordinarily used on military vehicles having an olive drab or camouflage color.

The backing or mounting plate 53 is preferably made of wood or plastic having a low heat conductivity. Each element is mounted with two or more nylon screws 57 which thread into the lower edges of the element. A nylon washer or spacer 58 is placed around each screw between the test element and the backing plate 53 to provide air circulation under the test element. A convenient size for the test element is 10 cm in diameter spaced one cm from the backing plate. As previously indicated each test element has a thermoelectric sensor which is conveniently bonded in the hollowed out portion of each element or the flat bottom of solid elements like element 52. If the heat capacity of the backing plate becomes significant this can be offset by a layer 59 of foam plastic one or two millimeters thick. If a greater thickness is required it may become necessary to use larger spacers. The test elements can also be made of copper, aluminum, glass or any of a variety of materials of which a target can be made. One material can also be used to simulate another selection of appropriate thickness.

The method using the apparatus is as follows:

a. Test elements are selected from a stockpile of standard shapes, sizes and materials, types previously manufactured or specially designed for certain targets;

b. If the test elements require thermo-electric devices these are added;

c. The test elements are attached to the backing plate and a multichannel recorder, if appropriate;

d. The unit is then deployed at a typical target site and the temperature of the test elements recorded for at least one twenty-four hour period or until certain typical weather cycles have been evidenced such as rain, snow, ice or a given wind velocity.

The target itself is then divided into areas of equal heat capacity and conductivity on the basis of the materials and their thicknesses of which it is composed; and a separate signature is finally constructed for each combination time, place and atmospheric weather condition on which data has been gathered.

The sequence of the above steps can be varied. For example, test data can be secured at random and later matched to specific targets. The multichannel recorder can be any of many commercial types such as analog multi-pen chart recorders or magnetic tape digital recorders. A small weather station (not shown) can be provided at the site, if desired, to more accurately record weather data. Many variations of the above structures and methods will be immediately apparent to those skilled in the art, but the invention is limited only as described in the claims which follow.

We claim:

1. The method of synthesizing the thermal signature of a target and background as seen through a thermal viewer comprising the steps of:

mounting a series of test elements having equal exposed surfaces, but different temperatures vs. time characteristics, when exposed to the same thermal radiation source, on a low heat capacity support member;

exposing said test elements simultaneously to at least a 24 hour variation of insolation at a plurality of widely separated geographical locations at different times of the year;

independently measuring the temperature vs. time characterstic of each test element; and correlating said test elements by composition and thickness to exposed surface areas of the target and background to construct a temperature as time signature of the two in combination.

2. The method according to claim 1 further including the steps of:

coating a number of said test elements with a material different from that of which each element is composed; and correlating such coated test elements with coated surface portions of said target and background.

* * * * *